April 8, 1952  F. L. BRECHT  2,591,778
EXPANSIBLE BRACELET
Filed Jan. 18, 1949
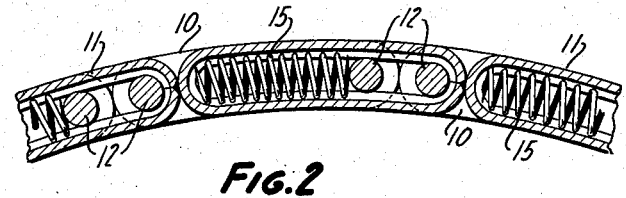
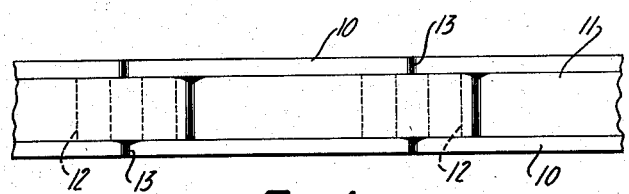
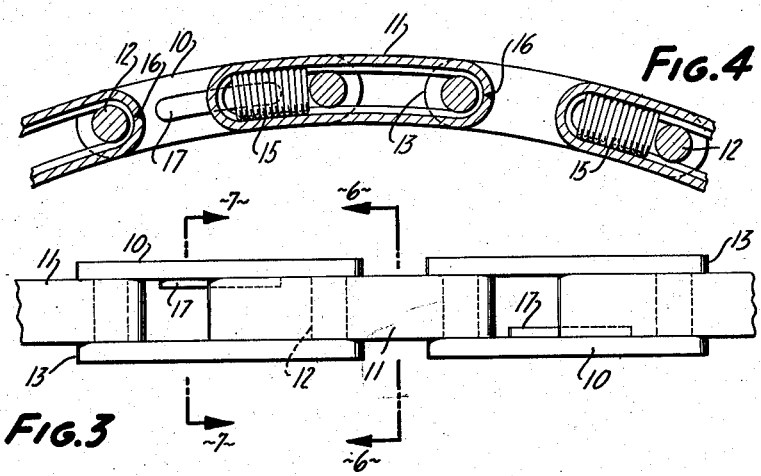
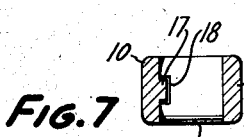
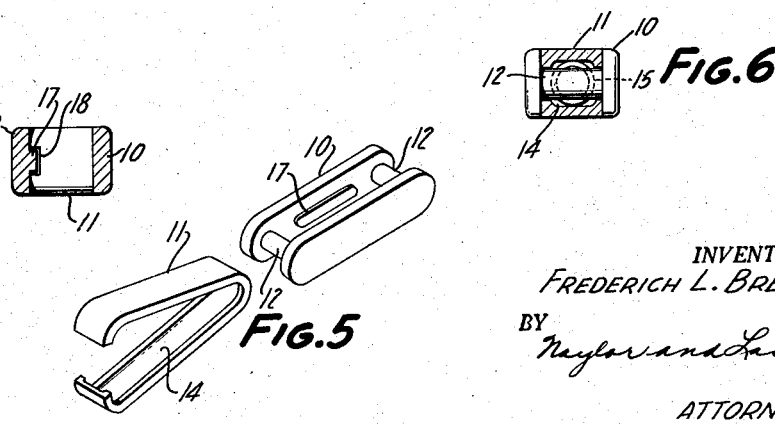
INVENTOR.
FREDERICH L. BRECHT
BY Naylor and Lassagne
ATTORNEYS Patented Apr. 8, 1952

2,591,778

UNITED STATES PATENT OFFICE 2,591,778

EXPANSIBLE BRACELET

Frederich L. Brecht, San Francisco, Calif.

Application January 18, 1949, Serial No. 71,485

1 Claim. (Cl. 63—5)

The present invention relates to improvement in the construction of bracelets or link bands of the extensible type.

The principal objects of the invention are to provide a yieldable link structure suitable for bracelets, watch bands, or the like, which will be simple in construction, free from binding during extension or contraction and of compact and pleasing external appearance.

The invention accordingly resides in the novel features of construction and inter-relation of parts hereinafter described and claimed and illustrated in the accompanying drawing where Figure 1 is a plan or top view of a portion of a band or bracelet embodying the invention, with links contracted;

Figure 2 is a central longitudinal sectional view of the linkage shown in Figure 1;

Figure 3 is a view as in Figure 1 showing several connected links as they appear when the band or bracelet is expanded;

Figure 4 is a central longitudinal sectional view of the expanded linkage shown in Figure 3;

Figure 5 is a perspective view showing two of the links as they appear when prepared for assembly;

Figure 6 is a cross section through one of the assembled links on line 5—5 of Figure 3, and Figure 7 is a similar cross section on line 7—7 of Figure 3.

In the embodiment of the invention herein disclosed the expansible band is composed of a series of outer links 10 and inner links 11. Each outer link is composed of a pair of spaced oblong side plates connected at the ends by cylindrical posts or pintles 12. The side plates are preferably formed with rounded ends 13 to afford rocking contact when the band is contracted as in Figure 1. The inner links are preferably formed from sections of a strip longitudinally channelled or grooved on one side. Each such section is formed by bending the metal thereof upon itself, as shown at the left of Figure 5, with the grooved surface 14 inward. In the assembled band each inner link 11 embraces two adjacent pintles 12 on links 10 and each link 11 houses a coil spring 15, inserted before closing the link as by welding at 16. This spring is proportioned to seat within the opposed grooves 14 of the link, thus reducing the thickness of the link and preventing distortion of the spring during contraction. Each spring bears on one end of a link 11 and one pintle 12 of a link 10, as seen in Figures 2 and 4. The springs thus tend to keep the band in contracted position as in Figures 1 and 2, with the rounded ends of the inner and outer series of links in contact, but will readily permit expansion as in Figures 3 and 4. To further assure maintenance of alignment in the assembled links each inner face of one of the side plates of links 10 is preferably formed with a guide ridge 17 fitting a notch 18 (Figure 7) in each of the rounded ends of links 11 against which the springs 15 bear and which slides relatively to outer link 10 during expansion and contraction of the band.

As is shown in Figure 3, the guide ridges 17 are alternately disposed on the inner faces of the outer links from link to link, there being but a single ridge for each link. The interconnected series of links, taken as a whole, is, however, guided for link movement at both sides by the alternate ridge location arrangement. Other advantages inhere in this guide ridge system over the use of two opposed ridges for each link. The links are lighter in weight, more readily manufactured, and, more importantly, the inner and outer links may be more readily and efficiently assembled when the outer link has one ridge instead of two. These advantages are obtained at no loss in guide efficiency.

The construction described permits proportioning of the inner and outer links in such manner that a compact band is produced with the exposed surfaces of the inner links 11 flush with the longitudinal edges of outer links 10 and the offset lines of contact between the series of outer and inner links movable on rounded ends to afford easy conformation to an arm or wrist without pinching.

It is obvious that modification as to minor details could be made without departure from the gist of the invention as hereinafter claimed.

What is claimed is:

In an expansible bracelet or the like, a series of outer links each consisting of spaced oblong side plates formed with rounded ends and having cylindrical pintles connecting said side plates at each end, a series of inner links connecting the outer links and each consisting of an internally and longitudinally grooved strip formed as an elongated loop having rounded ends, each inner link embracing the two pintles on adjacent ends of two outer links and having its exposed surfaces flush with the longitudinal edges of the outer links, a coil spring housed within each inner link with opposite sides seated in the grooved inner surfaces of said link and its respective ends bearing on a pintle of an outer link and an end of the inner link, said end of each inner link being formed with a lateral notch, and a guide ridge on a single inner face of each outer link in sliding engagement with said notch, with the guide ridges being alternately disposed on the inner faces of the outer links from link to link, the rounded ends of the inner and outer series of links respectively being normally in contact through action of said springs.

FREDERICH L. BRECHT.

REFERENCES CITED

The following references are of record in the file of this patent:

UNITED STATES PATENTS

| Number | Name | Date |
|---|---|---|
| 1,055,861 | Berkowitz | Mar. 11, 1913 |
| 1,082,473 | Callahan | Dec. 23, 1913 |
| 1,142,160 | Goldstein | June 8, 1915 |
| 1,586,320 | Nelson | May 25, 1926 |